Oct. 10, 1950     J. H. CAHN     2,525,587
SPRING MICROBALANCE

Filed March 1, 1946     2 Sheets-Sheet 1

INVENTOR
JULIUS H. CAHN
BY
ATTORNEY

Oct. 10, 1950     J. H. CAHN     2,525,587
SPRING MICROBALANCE

Filed March 1, 1946     2 Sheets-Sheet 2

INVENTOR
JULIUS H. CAHN
BY
ATTORNEY

Patented Oct. 10, 1950

2,525,587

UNITED STATES PATENT OFFICE 2,525,587

SPRING MICROBALANCE

Julius H. Cahn, Berkeley, Calif.

Application March 1, 1946, Serial No. 651,283

10 Claims. (Cl. 265—63)

This invention relates to weighing apparatus and more particularly to a spring microbalance in which the deflections of the spring are electronically measured by the frequency change produced in an oscillatory circuit in which the balance springs comprise the inductance and the balance pan comprises a plate of a variable capacitor. While weight responsive devices have hitherto been proposed employing an oscillatory circuit, the frequency of which is varied by a variable capacitor, one plate of which is associated with the object to be weighed and responsive to the weight thereof, it has been found in practice that these devices have not given the desired accuracy. It is, accordingly, one object of this invention to provide a weighing apparatus of the type described having increased accuracy.

It is a further object of this invention to provide a weighing apparatus of the type described capable of quickly and accurately weighing small objects.

It is a further object of this invention to provide weight apparatus employing an oscillatory circuit whose frequency is controlled by simultaneously varying both the inductance and capacitance of the circuit.

Other objects and advantages will appear hereinafter.

In the accompanying drawings, Figure 1 is a perspective view of a device embodying the present invention;

Figure 1:
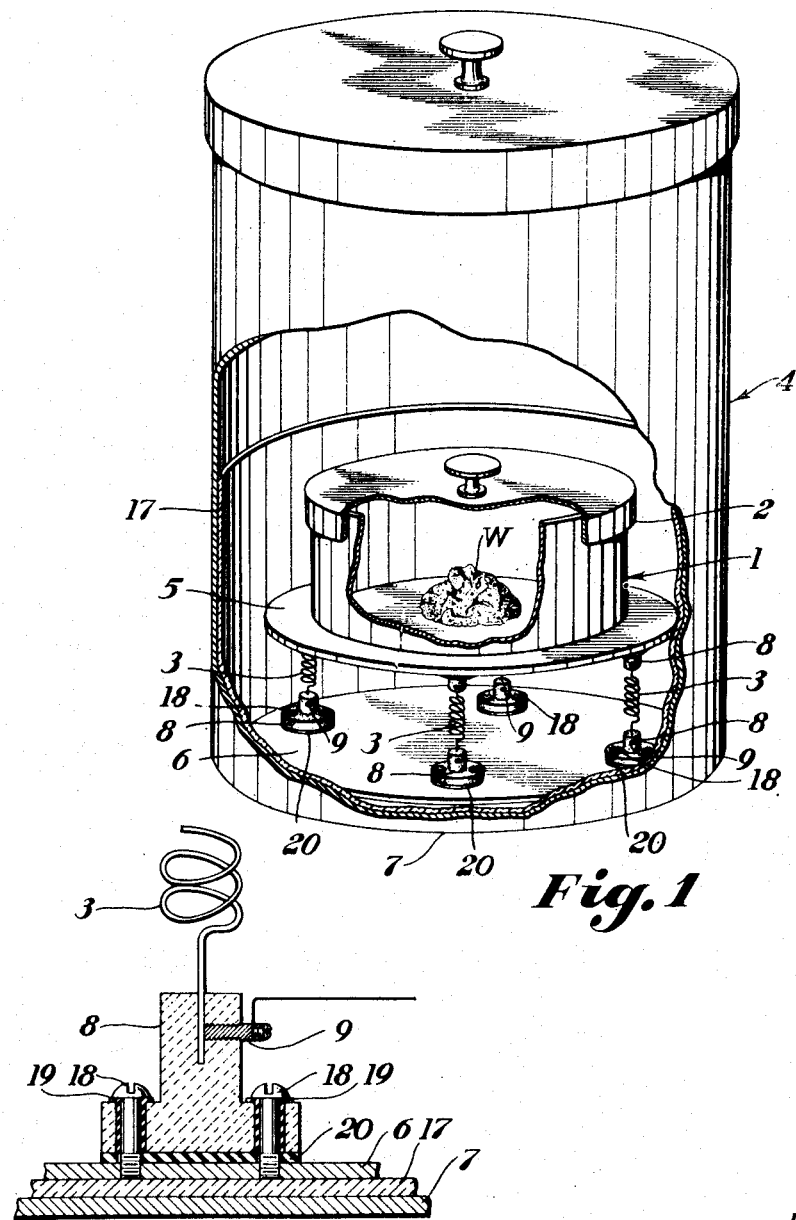

Referring more particularly to the drawings, there is illustrated a metallic container 4 in which is positioned a metallic receptacle 1 having a flanged cover 2, in which a suitable object W to be weighed may be placed. The metallic receptacle 1 rests upon a metallic disc 5, which disc is supported by a plurality (shown here as four in number) of compression springs 3. The compression springs 3 are secured at their upper ends to insulator posts 8 secured to the metallic plate 5 and at their lower ends to insulator posts 8 secured to a metallic disc 6. The metallic discs 5 and 6 form the plates of a variable capacitor and, as hereinafter more completely described, the compression springs 3 form variable inductors.

Figure 2:
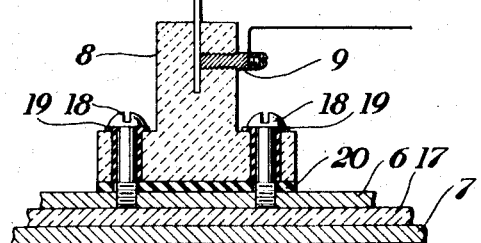
Fig. 2 is a vertical fragmentary section through one of the insulators of the oscillatory circuit.

Referring particularly to Fig. 2, the compression springs 3 are secured to insulator posts 8 by means of set screws 9, which set screws 9 may have a portion extending from the post 8 and forming electrical connection posts. The post 8 may be formed of any suitable material, such as Bakelite, brass or the like. The flange of the post 8 may be pierced by suitable holes and the post secured to the plates 5 or 6 by means of studs 18 insulated by sleeves 19 of any suitable insulating material, such as an "elastomer" of the type described in Industrial and Engineering Chemistry, volume 31, page 941, as for example those natural and synthesized compounds having rubberlike properties including the diene polymers, polychloroprenes, polyisobutylenes, polyalkylene sulphides, natural and compounded natural rubbers, products sold under the well known trade names "Thiokol," "Neoprene," "Koroseal" or the like. Furthermore, an insulating washer 20 of an "elastomer" may be interposed between the posts 8 and the plates 5 or 6 as shown. The bottom plate 6, in practice, rests upon the bottom wall 7 of the container 4. An insulating liner 17 of any suitable material, may be provided to prevent accidental shorting of the capacitor.

Figure 3:
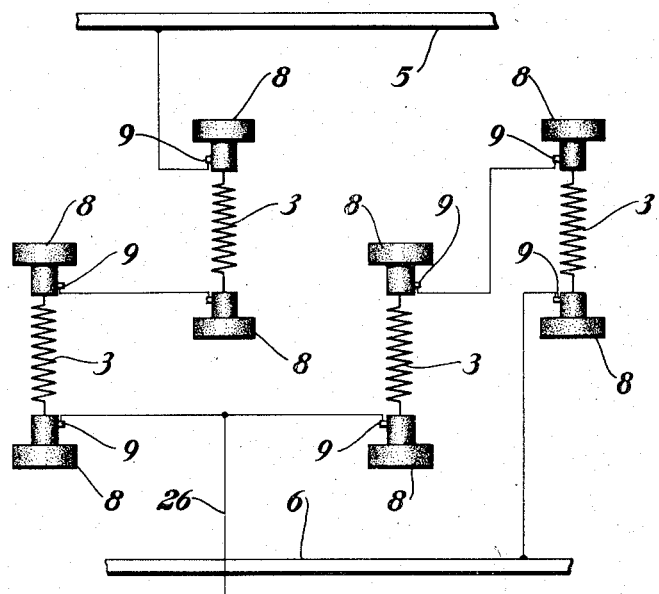
Fig. 3 is a diagrammatic view of a wiring arrangement for the inductor springs and capacitor plates.

Referring more particularly to Fig. 3, there is shown a wiring diagram for the capacitor formed by the plates 5 and 6 and the inductor compression springs 3 from which it is apparent that suitable electrical connections are provided from the upper plate 5 to the top of one of the insulated springs 3 from which the current will flow to the bottom of the spring, thence to the top of an adjacent spring, to the bottom of that spring, thence to the bottom of a next adjacent spring, to the top of that spring, thence to the top of another adjacent spring, to the bottom of that spring, and thence to the bottom plate 6. Intermediate the four springs a lead 26 is taken off to the filament resistor of the oscillatory circuit to be hereinafter described. It will thus be apparent that the plurality of compression springs 3 are connected in series so that their inductance is cumulative. It will be furthermore appreciated that any suitable number of compression springs 3 may be provided, thereby increasing the inductance of the system and the accuracy of the weighing apparatus.

Figure 4:
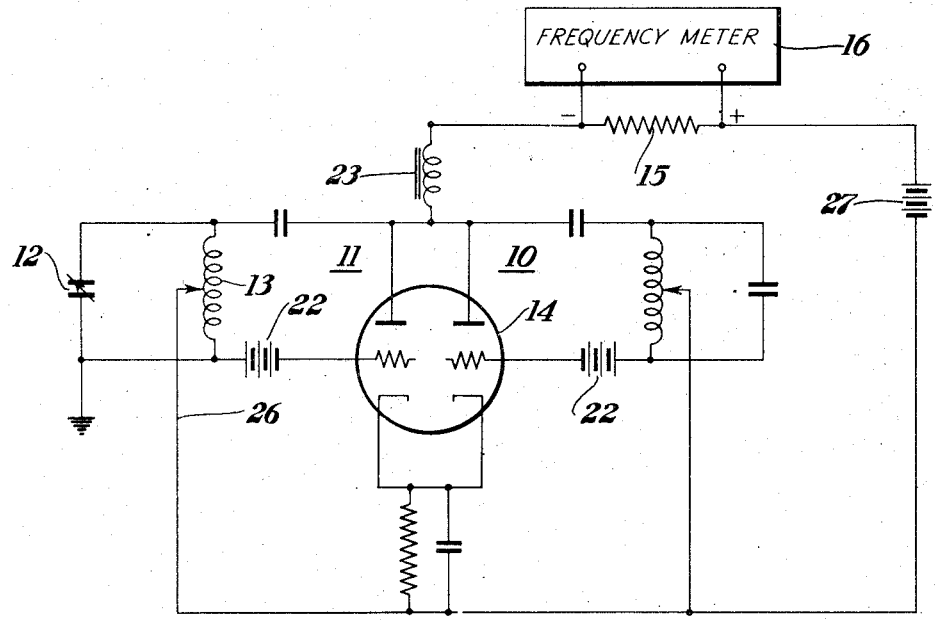
Fig. 4 is a wiring diagram of the circuit employed in the present invention.

Referring more particularly to Fig. 4, there is shown a wiring diagram of the device described including an oscillator 10 having a fixed frequency and an oscillator 11 having a variable frequency. The oscillator 11 includes a variable capacitor 12 which is formed by the plates 5 and 6 of the weighing apparatus, and a variable inductor 13 which is formed by the compression springs 3 of the weighing apparatus.

A twin triode 14 is provided, one section of the twin triode forming a part of the fixed oscillator 10 and the other section of the twin triode forming a part of the variable oscillator 11, the electrical oscillations generated by the fixed oscillator and those generated by the variable oscillator being mixed or heterodyned in the output to provide a beat frequency. The plate of the twin triode 14 is coupled to a choke 23 and to a load resistance 15 across which is shunted a frequency meter 16. Suitable grid bias batteries 22 for the grids of the twin triode 14 are provided as well as a plate supply 27.

In operation, a suitable object W to be weighed is placed within the metallic receptacle 1, thereby depressing the compression springs 3 and altering the inductance thereof. At the same time, the plates 5 and 6 of the capacitor 12 will approach each other more closely thereby increasing the capacitance thereof. It will thus be seen that both the inductance and the capacitance vary in the same sense as does the weight of the object to be weighed and as the frequency of the oscillatory system varies inversely as the square root of the product of the inductance and capacitance, an increase in the weight of the object W will cause a decrease in the frequency of the oscillator 11. The frequency of the oscillator 11 therefore varies in accordance with the weight of the substance W placed on the plate 5 and this variable frequency is mixed with the fixed frequency of the oscillator 10 to provide a beat frequency which will be recorded by the frequency meter 16 which can be calibrated to read directly in suitable units of mass.

In practice it has been found that employing the apparatus of the present invention, objects ranging from 0.001 to 100 grams may be quickly weighed to within one-tenth of a milligram.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. Apparatus for determining the weight of an object comprising a first member adapted to support said object and constituting one plate of a capacitor, a second member spaced from said first member and constituting the second plate of said capacitor, spring means mounted between and insulated from said members constituting electrical inductor means, means connected between said capacitor and inductor means for forming a resonant network, and means responsive to the value of the capacitance of said capacitor and to the value of the inductance of said inductor means for indicating the weight of said object.

2. Apparatus for determining the weight of an object comprising a capacitor including a movable weight responsive member as an element thereof, spring means supporting said weight responsive member and forming an inductor, the values of the capacitance of said capacitor and the inductance of said inductor varying with the weight of an object placed on said weight responsive member and in the same sense, means connected between said capacitor and inductor for forming a resonant network, and electrical means responsive to said values for indicating the weight of said object.

3. Apparatus for determining the weight of an object comprising a movable element of a variable capacitor supported by a compression spring on a fixed element of said capacitor and adapted to support such an object, said spring forming an inductor, a parallel resonant network including said capacitor and said inductor, the resonant frequency of said network varying in accordance with the weight of the object supported by said movable element, and means responsive to the resonant frequency of said network for indicating the weight of said object.

4. Apparatus for determining the weight of an object comprising a capacitor including a movable weight responsive member as an element thereof, spring means mounted between the plates of said capacitor for supporting said weight responsive member and forming an inductor, the values of the capacitance of said capacitor and inductance of said inductor varying with the weight of said object, a parallel resonant network including said capacitor and said inductor and having a resonant frequency varying with the weight of said object, an associated parallel resonant network having a fixed frequency, beat frequency means coupled to both of said networks and a frequency meter coupled with said beat frequency means for measuring said beat frequency to indicate the weight of said object.

5. Apparatus for determining the weight of an object comprising a capacitor including a movable weight responsive member as an element thereof, a plurality of compression springs supporting said weight responsive member and forming inductors, said inductors being connected in series relation, the values of the capacitance of said capacitor and the inductance of said inductor varying with the weight of said object and in the same sense, a parallel resonant network including said capacitor and said inductor and having a resonant frequency varying with the weight of said object, an associated parallel resonant network having a fixed frequency, beat frequency means coupled to both of said networks and a frequency meter coupled with said beat frequency means for measuring said beat frequency to indicate the weight of said object.

6. Apparatus for determining the weight of an object comprising a capacitor including a movable weight responsive member as an element thereof, a plurality of compression springs supporting said weight responsive member and forming inductors, said inductors being connected in series relation, the values of the capacitance of said capacitor and the inductance of said inductor varying with the weight of said object and in the same sense, a parallel resonant network including said capacitor and said inductor and having a resonant frequency varying with the weight of said object and in the same sense, an associated parallel resonant network having a fixed frequency, beat frequency means coupled to both of said networks and a frequency meter coupled with said beat frequency means for measuring said beat frequency to indicate the weight of said object.

7. Apparatus for determining the weight of an object comprising a capacitor including a movable weight responsive member as an element thereof, spring means mounted between the plates of said capacitor for supporting said weight responsive member and forming an inductor, the values of the capacitance of said capacitor and the inductance of said inductor varying with the weight of an object placed on said weight responsive member, means connected between said capacitor and inductor for forming a resonant network, and electrical means responsive to said values for indicating the weight of said object.

8. Apparatus for determining the weight of an object comprising a capacitor including a movable weight responsive member as an element thereof, a plurality of compression springs mounted between and insulated from the plates of said capacitor for supporting said weight responsive member and forming inductors, said inductors being connected in series relation, the values of the capacitance of said capacitor and the inductance of said inductors varying with the weight of an object placed on said weight responsive member, means connected between said capacitor and inductors for forming a resonant network, and electrical means responsive to said values for indicating the weight of said object.

9. Apparatus for determining the weight of an object comprising a capacitor including a movable weight responsive member as an element thereof, a plurality of compression spring supporting said weight responsive member and forming inductors, said inductors being connected in series relation, the values of the capacitance of said capacitor and the inductance of said inductors varying with the weight of an object placed on said weight responsive member and in the same sense, means connected between said capacitor and inductors for forming a resonant network, and electrical means responsive to said values for indicating the weight of said object.

10. Apparatus for determining the weight of an object comprising a container, a receptacle for such an object enclosed in said container and supported therefrom by a spring forming an inductor, a resonant network including said inductor and a variable capacitor formed by metallic plates within said container one of which is attached to said receptacle, and means responsive to the values of the electrical characteristics of said network for indicating the weight of the object.

JULIUS H. CAHN.

REFERENCES CITED

The following references are of record in the file of this patent:

UNITED STATES PATENTS

| Number | Name | Date |
| --- | --- | --- |
| 1,533,749 | Meirowsky | Apr. 14, 1925 |
| 1,796,150 | Hamer | Mar. 10, 1931 |
| 2,240,849 | Lubcke | May 6, 1941 |
| 2,316,915 | Truman | Apr. 20, 1943 |
| 2,322,681 | Zenor | June 22, 1943 |